(12) United States Patent
Watanabe et al.

(10) Patent No.: US 7,890,467 B2
(45) Date of Patent: Feb. 15, 2011

(54) METHOD FOR VERIFYING DATA CONSISTENCY OF BACKUP SYSTEM, PROGRAM AND STORAGE MEDIUM

(75) Inventors: Satoru Watanabe, Kokubunji (JP); Yoshio Suzuki, Kokubunji (JP); Shinji Fujiwara, Sagamihara (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 944 days.

(21) Appl. No.: 11/704,290

(22) Filed: Feb. 9, 2007

(65) Prior Publication Data

US 2008/0208923 A1 Aug. 28, 2008

(30) Foreign Application Priority Data

Jan. 10, 2007 (JP) ............................. 2007-002416

(51) Int. Cl.
*G06F 7/00* (2006.01)
(52) U.S. Cl. ...................... 707/648; 707/661
(58) Field of Classification Search ............... 707/640, 707/648, 661
See application file for complete search history.

(56) References Cited

U.S. PATENT DOCUMENTS

| 7,552,364 B2 * | 6/2009 | Johnson et al. ............... 714/47 |
| 2003/0217119 A1 * | 11/2003 | Raman et al. ............... 709/219 |
| 2004/0193625 A1 * | 9/2004 | Sutoh et al. .................. 707/100 |
| 2004/0249870 A1 * | 12/2004 | Jeevanjee et al. ............ 707/204 |
| 2005/0198456 A1 | 9/2005 | Watanabe et al. |
| 2005/0283504 A1 | 12/2005 | Suzuki et al. |
| 2006/0085672 A1 | 4/2006 | Watanabe et al. |
| 2007/0185852 A1 * | 8/2007 | Erofeev ......................... 707/4 |
| 2007/0185937 A1 * | 8/2007 | Prahlad et al. .............. 707/204 |
| 2007/0186068 A1 * | 8/2007 | Agrawal ...................... 711/162 |
| 2008/0126853 A1 * | 5/2008 | Callaway et al. .............. 714/13 |

FOREIGN PATENT DOCUMENTS

| JP | 07-234812 | 9/1995 |
| JP | 2001-051885 | 2/2001 |
| JP | 2005-250720 | 9/2005 |

OTHER PUBLICATIONS

Notification of Reasons for Refusal in Japanese Patent Application No. 2007-002416, Sep. 23, 2008 (with English translation).
Polyzois et al., "Evaluation of Remote Backup Algorithms for Transaction-Processing Systems", ACM Transactions on Database Systems, vol. 19, No. 3, Sep. 1994, pp. 423-449.

* cited by examiner

*Primary Examiner*—James Trujillo
*Assistant Examiner*—Linh Black
(74) *Attorney, Agent, or Firm*—Brundidge & Stanger, P.C.

(57) ABSTRACT

A technology for verifying backup data capable of synchronizing timings of checksum calculation and verifying data consistency regardless of the storing position of the data is provided. In a backup system using a data update log, a checksum of data of a backup source and a checksum of backup data are checked, thereby verifying data consistency. Data check log generation means and the like are provided so that the data update log and the data check log are transmitted in order to a secondary site. By this means, the timings of the checksum calculation are synchronized. Further, by providing data area extraction means and the like, the verification of data consistency can be performed regardless of the storing position of the data.

7 Claims, 17 Drawing Sheets

FIG. 3

| 301 : LOGICAL BLOCK ADDRESS | 302 : DATA |
|---|---|
| 0 | "AAA" |
| 1 | "BBB" |
| 2 |  |
| ⋮ | ⋮ |

FIG. 4

| 401 : TABLE NAME | 402 : START LBA | 403 : END LBA |
|---|---|---|
| Stock | 0 | 7999 |
| Customer | 10000 | 17999 |
| ⋮ | ⋮ | ⋮ |

| 601 : TABLE NAME | 602 : DATA FORMAT |
|---|---|
| Stock | Item_ID(INT), Quantity(INT) |
| Customer | Customer_ID(INT), Name(CHAR[30]) |
| | |

| Item_ID | Quantity |
|---------|----------|
| 10 | 1 |
| 11 | 2 |
| 12 | 3 |
| 13 | 4 |
| 14 | 5 |
| 15 | 6 |
| 16 | 7 |
| 17 | 8 |
| 18 | 9 |
| 19 | 10 |

FIG. 12

| PAGE NUMBER | DATA |
|---|---|
| 0 | 1,100 , 100,1 |
| 1 | 2,21 |

FIG. 13

| PAGE NUMBER | CHECKSUM |
|---|---|
| 0 | 202 |
| 1 | 23 |

FIG. 16

SQL STATEMENT: SELECT Quantity from Stock where 10 $\leq$ Item_ID and Item_ID $\leq$ 19, Checksum: 55

FIG. 17

Data Area Name: Stock, Page number 1: 202, Page number 2: 23 ------------------------

METHOD FOR VERIFYING DATA CONSISTENCY OF BACKUP SYSTEM, PROGRAM AND STORAGE MEDIUM

CROSS-REFERENCE TO RELATED APPLICATION

The present application claims priority from Japanese Patent Application No. JP 2007-002416 filed on Jan. 10, 2007, the content of which is hereby incorporated by reference into this application.

TECHNICAL FIELD OF THE INVENTION

The present invention relates to a technology for verifying backup data. In particular, it relates to a technology effectively applied to a method for verifying data consistency of backup system, program, storage medium and others.

BACKGROUND OF THE INVENTION

A data backup system using two calculating systems has been used widely. The term "data backup" means preparing the same data as that of one calculating system, and storing it in the other calculating system. The calculating system of a backup source is referred to as a primary system, and the calculating system of a backup destination is referred to as a secondary system. Further, the data stored in the secondary system is referred to as a backup data. The data backup by a duplex system is disclosed in, for example, CHRISTOS A. POLYZOIS, HECTOR GARCIA-MOLINA, "Evaluation of Remote Backup Algorithms for Transaction-Processing Systems", ACM Transactions on Database Systems, Vol. 19, No. 3, September 1994, Pages 423-449 (Non-Patent Document 1).

As a backup system by the duplex system, a log transfer system has been known. This log transfer system is a system where a data update log of the primary system is transferred to the secondary system and backup data is prepared in the secondary system. In this log transfer system, at the stage of starting the backup, the data of the primary system and the backup data of the secondary system are made identical. After starting the backup, the data update log of the primary system is transferred to the secondary system. In the secondary system, based on the transferred data update log, the backup data is updated to prepare a latest backup data. The process for reflecting the data update log on the backup data is referred to as a log application. The log transfer system is disclosed in the above-described Non-Patent Document 1.

In the log transfer system, in order to confirm that the backup data is normally prepared, it is necessary to verify the consistency of the data of both systems. As a method for verifying the consistency of two data, a checksum method in which the data is regarded as a numerical value and a total of such values is checked is known. When verifying consistency of the data of both systems, a checksum of the data of the primary system and a checksum of the backup data of the secondary system are checked, thereby verifying whether or not the data are consistent.

As software for managing the data of the calculating system, a Database Management System (hereinafter, referred to as DBMS) has been in wide use. In general, the DBMS manages data by using a data main body and a data update log, and the above-described log transfer system has been used widely for the backup of the data managed by the DBMS.

In general, the DBMS manages the data main body by splitting it into data areas of a given size (for example, 8 KB). This data area is referred to as a page, and is managed with a number attached on it. In the data update log, page numbers and contents of data update are written. For example, when data having an Item_ID of 1 and a Quantity of 10 is added onto a page of the page number 100, a data update log with the content of [data having an Item_ID of 1 and a Quantity of 10 is added onto the page number 100] is recorded. In the secondary system having received such data update log, the data having "an Item_ID of 1 and a Quantity of 10" is added onto the page number 100 of the backup data.

SUMMARY OF THE INVENTION

The first problem to be solved by the present invention is that the timings for calculating the checksums are not synchronized in both systems. Even when data on the primary system side is updated, if the data update log thereof is not applied to the backup data, the checksums are not consistent. For this reason, it is necessary that the data update is once stopped to calculate the checksum on the primary system side and the checksum is calculated on the secondary system side at the time when all the data update logs are applied to the backup data, and then, both of the checksums are checked. However, in such a method, a demerit that the data update of the primary system has to be stopped occurs.

The second problem to be solved by the present invention is that, even when the contents of the data of both systems are the same, there is a possibility that they are determined to be inconsistent. For example, when the data update log in which [data having an Item_ID of 1 and a Quantity of 10 is added on the page 100] is written is applied to the backup data, the position on the page 100 where the data is stored is determined on the secondary system side. If a position where the data is stored on the primary system side and a position where the data is stored on the secondary system side are different, the checksum values of both systems are different, and they are determined to be inconsistent. For example, when the data is stored at the head of the page on the primary system side and the data is stored at the end of the page on the secondary site, the data at the head of the page is overwritten only on the primary system side, and the checksums of both systems become inconsistent. More specifically, although they have the same contents in terms of the data managed by the DBMS, since the storage positions of the data are different, there is a possibility that the checksums are not consistent.

Hence, an object of the present invention is to provide a verifying technology of the backup data, in which the first problem and the second problem can be solved, the timings of checksum calculation are synchronized in both systems, and the verification of data consistency is possible without depending on the storage positions of the data.

The above and other related objects and new features of the present invention will be apparent from a reading of the present specification and the accompanying drawings.

The typical ones of the inventions disclosed in this application will be briefly described as follows.

The present invention has the following features in order to verify the consistency of data of a primary system and data of a secondary system in a system where a data update log is transmitted from the primary system to the secondary system to back up the data.

(1) The software (functions by the program) operating in the primary system includes: data area extraction means for extracting data from a data storage area; checksum calculation means for calculating a checksum of the data storage area of the primary system; data check log generation means for generating a data check log including the checksum; and log transmission means for transmitting the data check log and the data update log to the secondary system.

(2) The software (functions by the program) operating in the secondary system includes: log receiving means for receiving a log from the primary system; log application means for preparing backup data based on the received data update log; data area extraction means for extracting data from the data storage area; checksum calculation means for calculating the checksum of the data storage area of the secondary system; and checksum checking means for checking the calculated checksum and the checksum included in the data check log.

(3) The data update log and the data check log have their order, and this order is determined according to an order in which the corresponding data of the data update log is updated and an order in which the corresponding checksum of the data check log is calculated.

The effects obtained by typical aspects of the present invention will be briefly described below.

According to the present invention, by providing the data check log generation means so as to transmit the data update log and the data check log to the secondary site in a proper order, the timings of the checksum calculation can be synchronized. Further, by providing data area extraction means, the verification of data consistency becomes possible without depending on the storage positions of the data. As a result, a check operation of the backup data can be facilitated.

BRIEF DESCRIPTIONS OF THE DRAWINGS

FIG. 3 is a diagram showing an example of a method of storing data in an external storage device in the backup system in an embodiment of the present invention;

FIG. 4 is a diagram showing an example of a method of managing the correlation between a table and a storage area in the backup system in an embodiment of the present invention;

FIG. 12 is a diagram showing an example of a data extracting method of data area extraction means in the backup system in an embodiment of the present invention;

FIG. 13 is a diagram showing a checksum calculating example of the checksum calculation means in the backup system in an embodiment of the present invention;

FIG. 16 is a diagram showing an example of the written content of the data check log in the backup system in an embodiment of the present invention;

FIG. 17 is a diagram showing another example of the written content of the data check log in the backup system in an embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Figure 1:
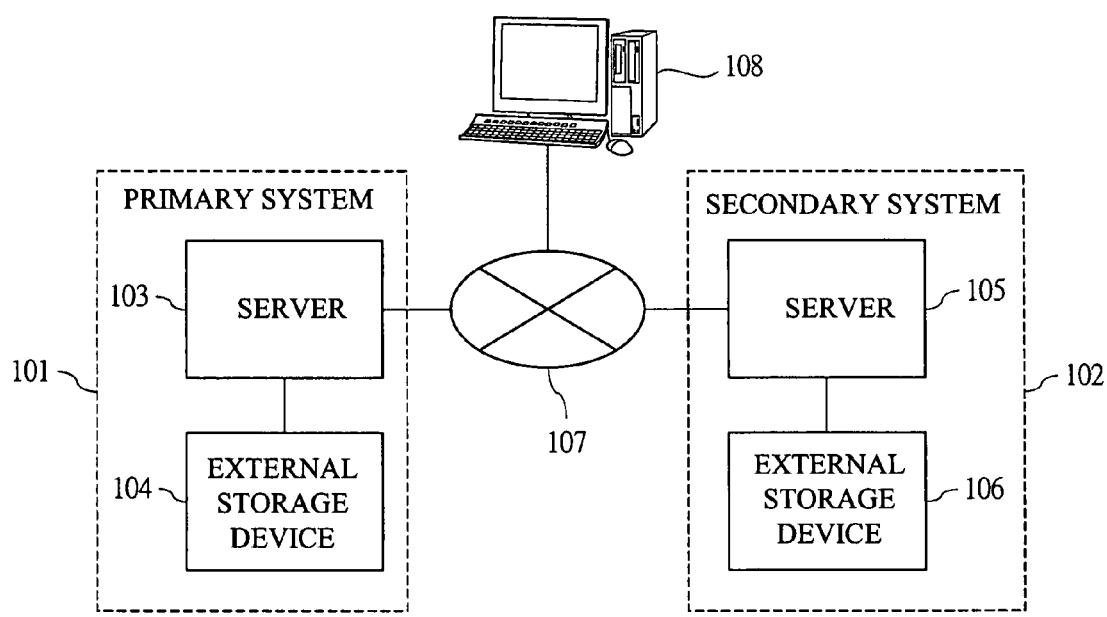
FIG. 1 is a diagram showing a system configuration example of a data backup system according to the duplex system in an embodiment of the present invention.

FIG. 1 is a diagram showing a system configuration example of the data backup system according to the duplex system in an embodiment of the present invention.

The data backup system according to the duplex system of the present embodiment includes two calculating systems. A calculating system of a backup source is referred to as a primary system 101 of a primary site, and a calculating system of a backup destination is referred to as a secondary system 102 of a secondary site. The primary system 101 includes a server 103 and an external storage device 104. The secondary system 102 includes a server 105 and an external storage device 106. The primary system 101 and the secondary system 102 are connected by a network 107. Further, an operation terminal 108 is connected to a network 107. By operating the operation terminal 108, a command can be inputted to the server 103, and a response from the server 105 can be received.

Figure 2:
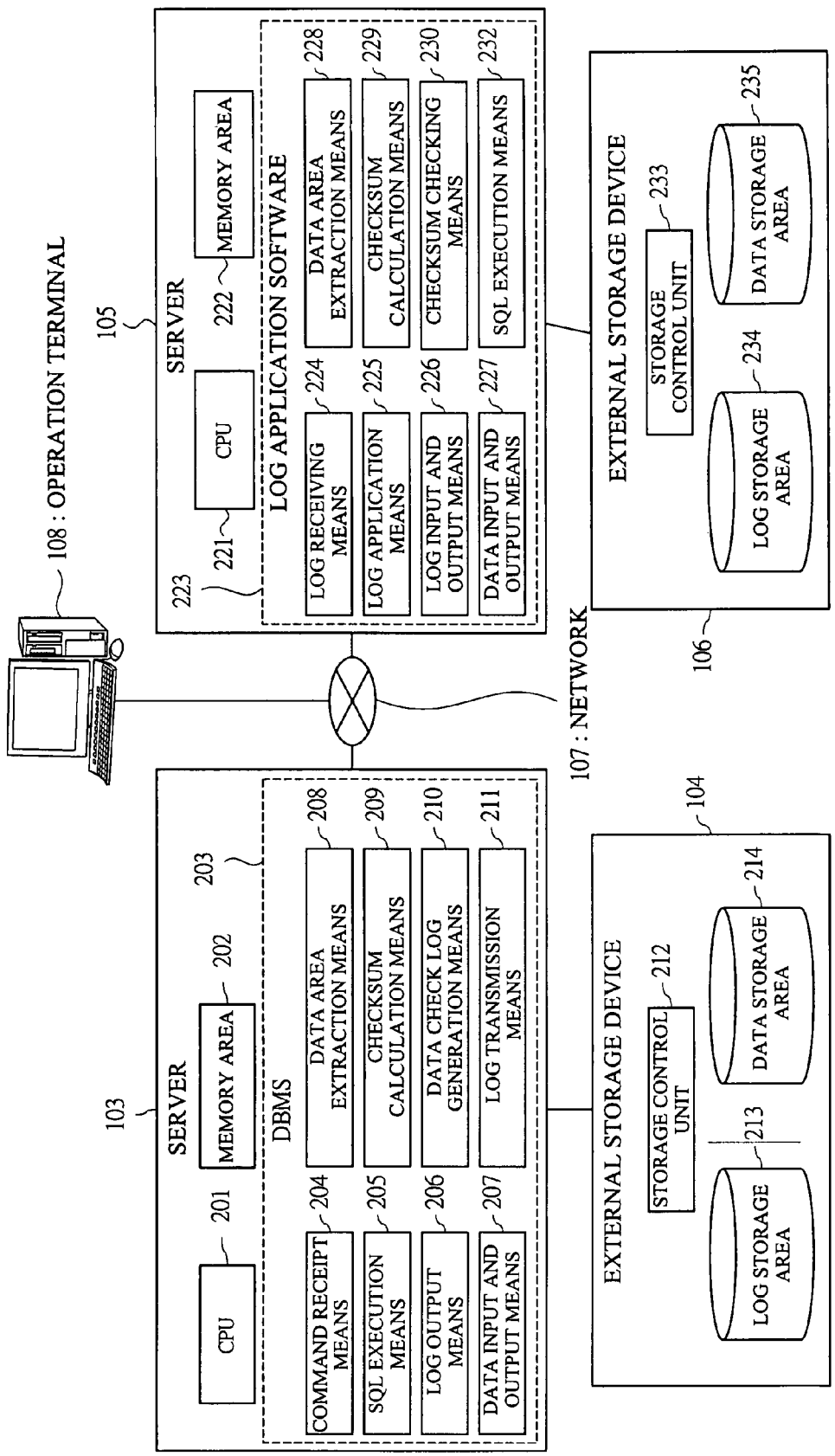
FIG. 2 is a diagram showing the system configuration example of the data backup system according to the duplex system in an embodiment of the present invention in detail.

FIG. 2 is a diagram showing the system configuration example of the data backup system according to the duplex system in the present embodiment in detail.

The server 103 of the primary system includes a central processing unit (CPU) 201 and a memory area 202 and operates a DBMS 203. The DBMS 203 is software to perform data management, and its program is stored in the memory area 202 and is executed by the CPU 201. The DBMS 203 includes respective means such as command receipt means 204 for receiving a command from the operation terminal 108, SQL execution means 205 for executing the data operation, log output means 206 for outputting a log, data input and output means 207 for inputting and outputting data, data area extraction means 208 for extracting data from a data storage area, checksum calculation means 209 for calculating a checksum of the data storage area, data check log generation means 210 for generating a data check log including a checksum, and log transmission means 211 for transmitting a data check log and a data update log to the secondary system 102. The external storage device 104 of the primary site includes a storage control unit 212, a log storage area 213, and a data storage area 214. The log storage area 213 and the data storage area 214 are devices which store data in accordance with the instruction from the storage control unit 212.

The server 105 of the secondary system includes a central processing unit (CPU) 221 and a memory area 222 and operates log application software 223. The log application software 223 is software to prepare backup data, and its program is stored in the memory area 222 and is executed by the CPU 221. The log application software 223 includes respective means such as log receiving means 224 for receiving a log from the primary system 101, log application means 225 for preparing backup data based on the received data update log, log input and output means 226 for inputting and outputting a log, data input and output means 227 for inputting and outputting data, data area extraction means 228 for extracting data from the data storage area, checksum calculation means 229 for calculating a checksum of the data storage area, checksum checking means 230 for checking the calculated checksum and the checksum included in the data check log, and SQL execution means 232 for executing the data operation. The external storage device 106 of the secondary site includes a storage control unit 233, a log storage area 234, and a data storage area 235. The log storage area 234 and the data storage area 235 are devices which store data in accordance with the instruction from the storage control unit 232.

The storage control unit 212 manages the log storage area 213 and the data storage area 214 by splitting them into given areas (for example, 512 bytes). Each of the split areas is referred to as a logical block and is attached with a number referred to as a logical block address (LBA). FIG. 3 (an example of a method of storing data in the external storage device) is a diagram showing an example of storing data in the log storage area 213 and the data storage area 214. In the example of FIG. 3, with respect to the LBA 301 and the data 302, data "AAA" is stored in an LBA number 0 and data "BBB" is stored in an LBA number 1. When the storage control unit 212 receives a command of [Read data of the LBA number 0] from the server 103, the data "AAA" is transmitted to the server. Further, when the storage control unit 212 receives a command of [Write data "ABCD" in the LBA number 1] from the server 103, the data "ABCD" is stored in the LBA number 1. In this manner, the server 103 issues the instruction to the storage control unit 212 by designating the LBA, thereby operating data of the external storage device 104.

The DBMS 203 manages the data storage area 214 by splitting it into areas of a given size (for example, 8 KB). This data area is referred to as a page and is managed with a number attached on it. In order to manage the correlation between the page and the LBA, the DBMS 203 stores a data area management table illustrated in FIG. 4 (an example of the method of managing the correlation between the table and the storage area) in the memory area 202. A table name 401, a start LBA 402, and an end LBA 403 are written in the data area management table. The example of FIG. 4 shows that a Stock table is stored in LBA numbers 0 to 7999 and a Customer table is stored in LBA numbers 10000 to 17999. Therefore, assuming that a page size is 8 KB and a size of the logical block is 512 bytes, when the page number 0 of the Stock table is to be read, the data of the LBA numbers 0 to 15 of the data storage area 214 are read. Further, when data is to be written in the page of the page number 1 of the Stock table, the data are written in the LBA numbers 16 to 31 of the data storage area 214.

Figures 5, 6:
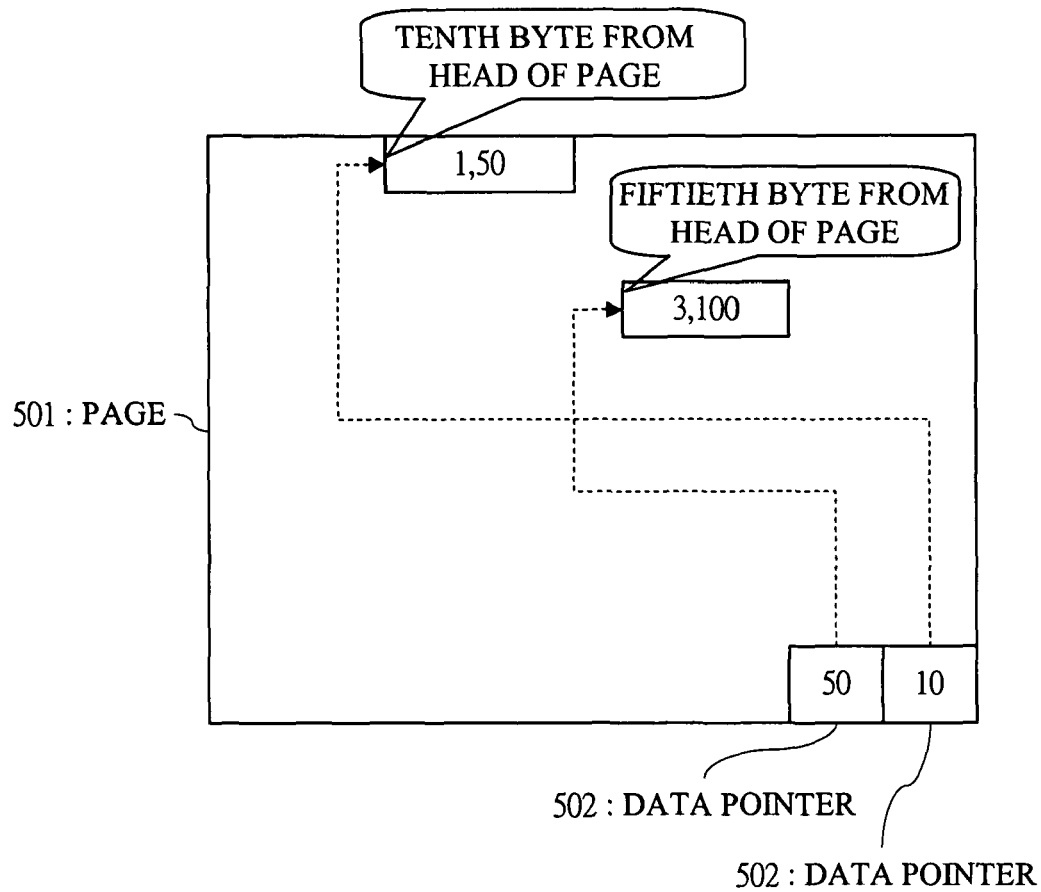
FIG. 5 is a diagram showing an example of a storing method of pages in the backup system in an embodiment of the present invention.
FIG. 6 is a diagram showing an example of a method of managing the columns of the table in the backup system in an embodiment of the present invention.

FIG. 5 (an example of a storing method of pages) is a conceptual diagram showing a method of storing data into pages. A page 501 is a data area of 8 KB, and a data pointer 502 is stored at the end of the page 501. The data pointer 502 shows at how many bytes from the head of the page the data is stored. The example of FIG. 5 shows that the data are stored at the tenth and fiftieth bytes from the head of the page.

Further, the DBMS 203 stores a data format management table illustrated in FIG. 6 (an example of the management method of columns of a table) in the memory area 202. A table name 601 and a data format 602 are written in the data format management table. The example in FIG. 6 shows that an Item_ID and a Quantity are stored in the Stock table in an integer form (INT), and a Customer_ID in an integer form and Name in a string of 30 characters (CHAR[30]) are stored in the Customer table. In the example of the page illustrated in FIG. 5, [1, 50] is stored as a first data. If this page is a page of the Stock table, it can be understood that data having "the Item_ID of 1 and the Quantity of 50" is stored as the data of the Stock table based on the data format management table of FIG. 6. Incidentally, the Item_ID, Quantity, Customer ID, Name and the like are often referred to as column names.

The DBMS 203 manages the log storage area 213 by splitting it into areas of a given size (for example, 1024 bytes). Consequently, assuming that a size of the logical block is 512 bytes, the first log is stored in LBA numbers 0 to 1 of the log storage area 213, and the second log is stored in LBA numbers 2 to 3 of the log storage area 213.

In the foregoing, the method of storing the pages in the data storage area 214 and the method of storing the logs in the log storing area 213 by the DBMS 203 have been described. The data input and output means 207 performs the input and output of the pages in accordance with the method described above. Further, the log output means 206 performs the output of the logs in accordance with the method described above.

The method of storing the pages in the data storage area 235 and the method of storing the logs in the log storing area 234 by the log application software 223 are also the same as those described above. More specifically, in the same manner as that of the primary site, the data area management table and the data format management table are stored in the memory area 222, and the data input and output means 227 and the log input and output means 226 perform the operation of the data stored in the external storage device 106 by using information from these tables.

Hereinafter, the DBMS 203 and the operations of the log application software 223 will be described.

Figure 7:
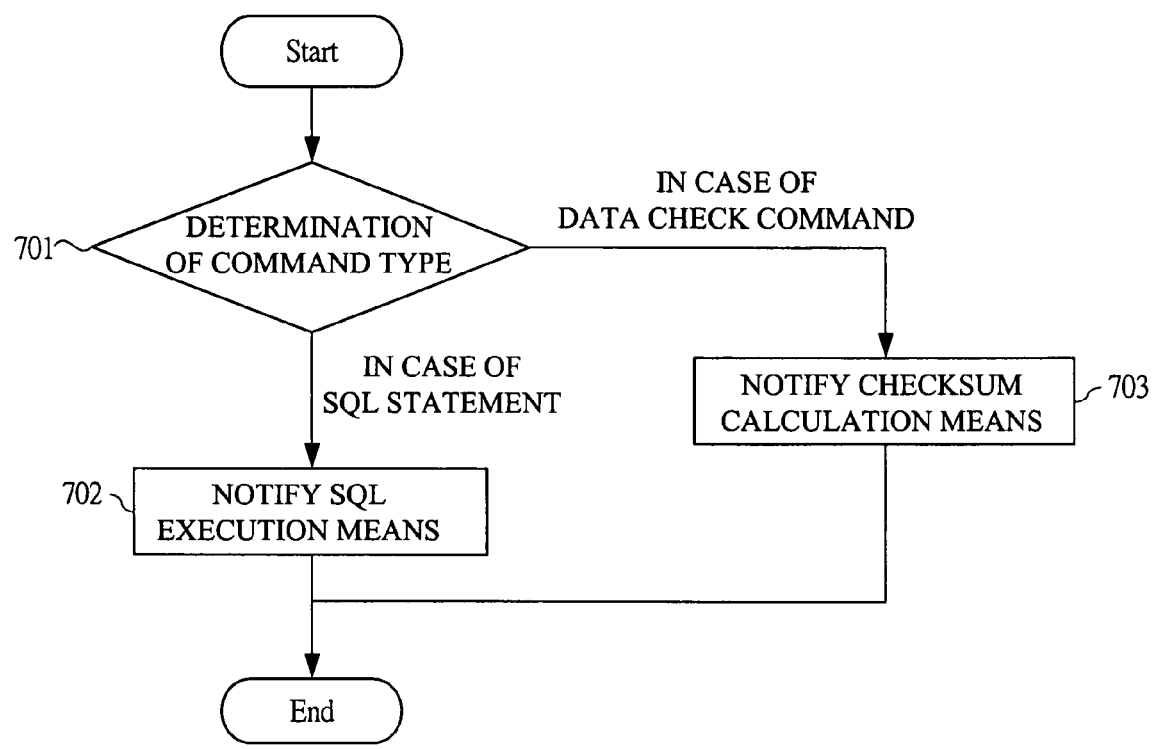
FIG. 7 is a flowchart showing the operations of command receipt means in the backup system in an embodiment of the present invention.

FIG. 7 is a flowchart showing operations of the command receipt means 204. The command receipt means 204 starts operating when it receives a command from the operation terminal 108. At a determination 701, it is determined whether the received command is an SQL statement or a data check command. When the received command is an SQL statement, the operation proceeds to a process 702, and the SQL statement is notified to SQL execution means 205. Further, when the received command is a data check command, the operation proceeds to a process 703, and it is notified to checksum calculation means 209. Note that the means 204 can also receive a data check command which designates the data area of a check target and a data check command which designates an SQL statement.

Figure 8:
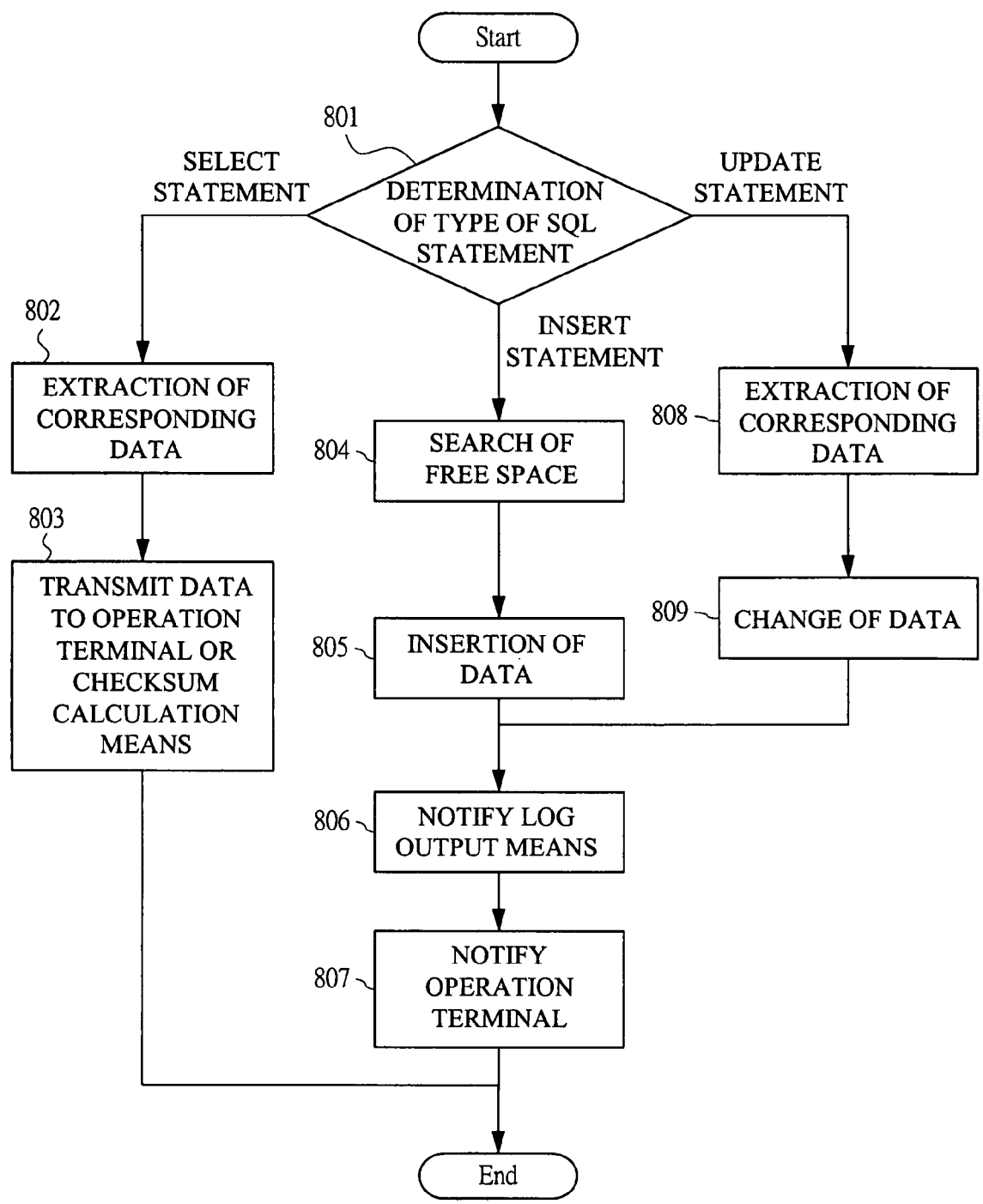
FIG. 8 is a flowchart showing the operations of SQL execution means in the backup system in an embodiment of the present invention.

FIG. 8 is a flowchart showing operations of the SQL execution means 205. Representative types of the SQL statement include a SELECT statement, an INSERT statement, and an UPDATE statement. As the SQL statement, there are some other statements such as a DELETE statement and a FETCH statement. In the following description, however, the operations of the SQL execution means 205 will be described by using the SELECT statement, the INSERT statement, and the UPDATE statement.

Figures 9, 10:
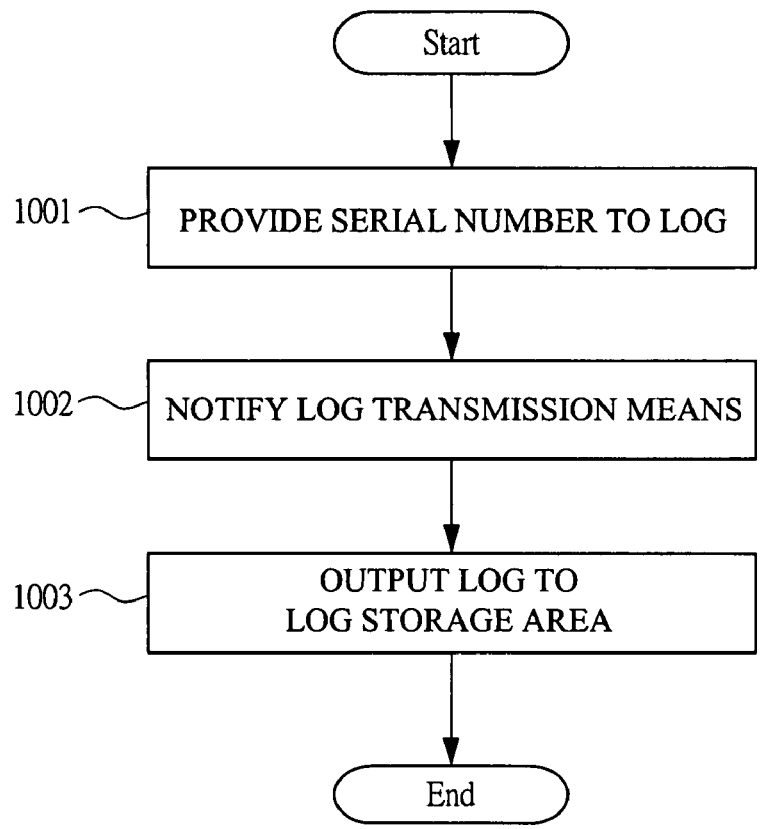
FIG. 9 is a diagram showing an SQL execution example of the SQL execution means in the backup system in an embodiment of the present invention.
FIG. 10 is a flowchart showing the operations of log output means in the backup system in an embodiment of the present invention.

At a determination 801, a type of the SQL statement is determined, and the operation is branched here in accordance with processing contents corresponding to the determined type. The SELECT statement is an SQL statement for reading designated data, and it is written in a format of, for example, [SELECT Quantity from Stock where 10<=Item_ID and Item_ID<=19]. This is an instruction to read the data of the Quantity in which the Item_ID is 10 or more and 19 or less from the Stock table. When such an SQL statement is received, at a process 802, the pages of the Stock table are read from the data storage area 214 by using the data input and output means 207, and the data of a Quantity in which the Item_ID is 10 or more and 19 or less is extracted. As illustrated in FIG. 9 (an SQL execution example of the SQL execution means), the data to be extracted is a set of the Item_ID and the Quantity. The example of FIG. 9 shows that the Quantity when the Item_ID is 10 is 1, and the Quantity when the Item_ID is 11 is 2. At a process 803, the extracted data is transmitted to the operation terminal 108. Note that, as described later, the SQL execution means 205 transmits the extracted data to the checksum calculation means 209 when instructed from the checksum calculation means 209.

The INSERT statement is an SQL statement to add a designated data, and it is written in a format of, for example, [INSERT INTO Stock (Item_ID, Quantity) VALUES (100, 50)]. This is an instruction to add a data in which the Item_ID is 100 and the Quantity is 50 to the Stock table. When such an SQL statement is received, at a process 804, the pages of the Stock table are read from the data storage area 214 by using the data input and output means 207, and the pages in which there are free spaces to store the data are searched. For example, when there is a free space in the page 500, the data in which the Item_ID is 100 and the Quantity is 50 is added to the page 500 at a process 805. At this time, as illustrated in FIG. 5, the data is added in the page, and at the same time, a data pointer is added to the end of the page. At a process 806, since the data update log is outputted, it is notified to the log output means 207.

The UPDATE statement is an SQL statement to rewrite a content of the designated data, and it is written in a format of, for example, [UPDATE STOCK SET Quantity=101 Where Item_ID=1]. This is an instruction to rewrite the Quantity of the data in which the Item_ID is 1 in the Stock table to 101. When such an SQL statement is received, at a process 808, the page where the data having the Item_ID of 1 is stored is read by using the data input and output means 207. When the data having the Item_ID of 1 is stored in the page with the page number 3, the Quantity with the Item_ID of 1 in the page number 3 is changed to 101 at a process 809. At the process 806, similar to the case of the INSERT statement, since this data update log is outputted, it is notified to the log output means 206. Then, at the process 807, it is notified to the operation terminal 108.

FIG. 10 is a flowchart showing the operations of the log output means 206. The log output means 206 which has received the notification provides a serial number to the log at a process 1001. The data update log provided with the serial number has a content such as [Add the data having the Item_ID of 100 and the Quantity of 50 to the log number 1 and the page 500] or [Change the Quantity of the data having the Item_ID of 1 at the log number 2 and the page 3 to 101]. The serial number of the log is provided according to an order in which the data is updated or an order in which the checksum of the data check log is calculated. Accordingly, by this serial number, it is possible to determine up to which data update has been completed at the time when the checksum is calculated. The log output means 206 notifies the log to the log transmission means 211 at a process 1002. The log transmission means 211 transmits the log of the log receiving means 224. Further, the log output means 206 outputs the log to the log storage area 213 at a process 1003.

Figure 11:
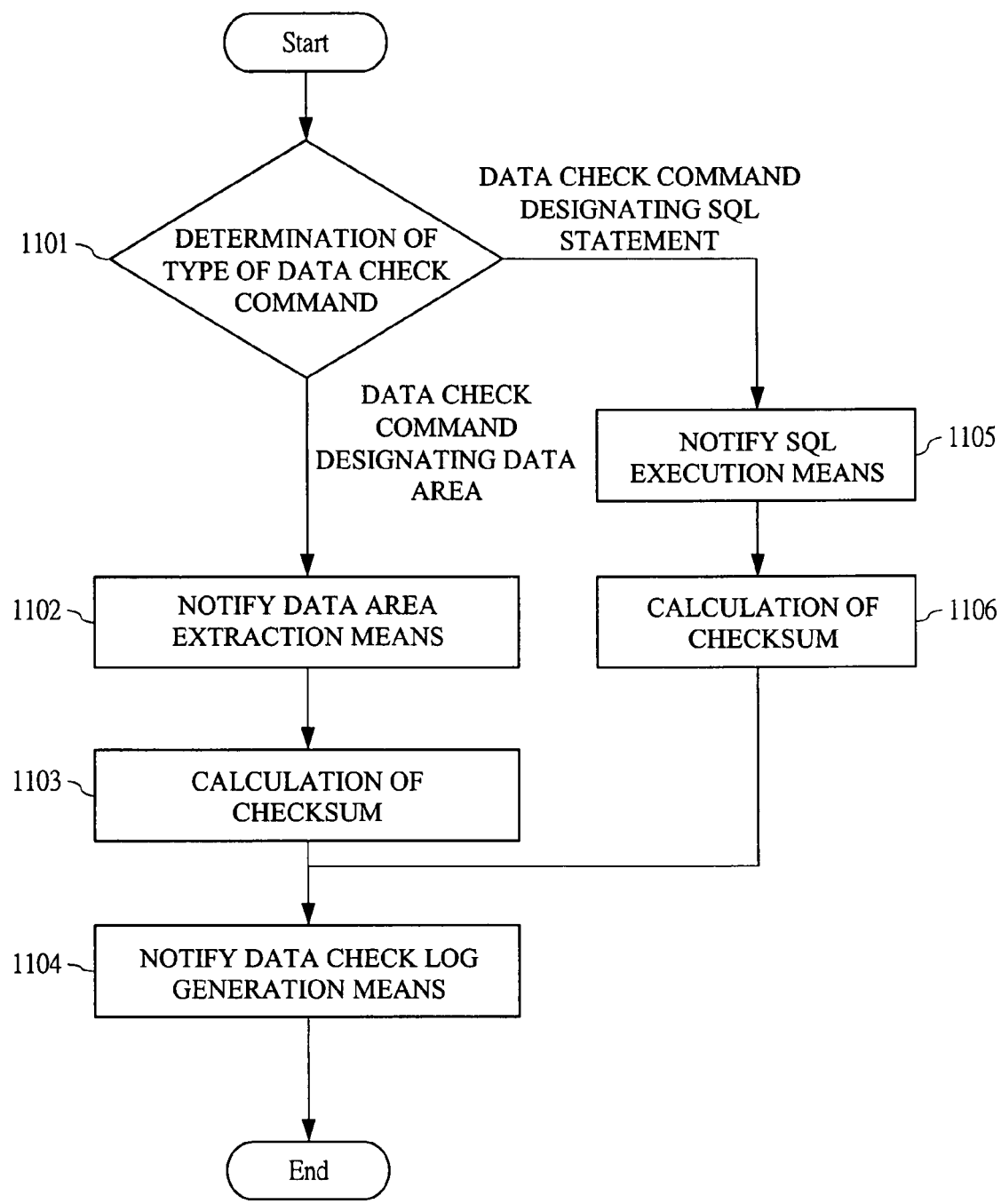
FIG. 11 is a flowchart showing the operations of checksum calculation means in the backup system in an embodiment of the present invention.

FIG. 11 is a flowchart showing the operations of the checksum calculation means 209. The checksum calculation means 209 starts operating when it receives a notification from the command receipt means 204. At a determination 1101, a type of the data check command is determined.

An SQL statement used for data check is written in data check command designating the SQL statement. For example, it receives a command of, for example, [SQL statement: data check by "SELECT Quantity from Stock where 10<=Item_ID and Item_ID<=19"]. When such a command is received, this SQL statement is notified to the SQL execution means 205 at a process 1105. The SQL execution means 205 notifies an execution result of this SQL statement to the checksum calculation means 209. The result to be notified from the SQL execution means 205 is, for example, an execution result of the SQL statement illustrated in FIG. 9. At a process 1106, the checksum of this result is calculated. In the case of the execution result of FIG. 9, values of the Quantity notified as the execution result of the SQL statement, that is, 1 to 10 are summed up and a checksum of 55 is calculated. The calculated checksum and the SQL statement are notified to the data check log generation means 210 at a process 1104.

A table name of a check target is written in the check command designating the data area. For example, it receives a command of, for example, [Check the data of the Stock table]. When such a command is received, it is notified to the data area extraction means 208 at a process 1102. As described later, the data area extraction means 208 notifies the data in each page stored in the Stock table as illustrated in FIG. 12 (an example of a data extraction method of the data area extraction means). The example of FIG. 12 shows that the data in which the Item_ID is 1 and the Quantity is 100 and the data in which the Item_ID is 100 and the quantity is 1 are stored in the page number 0 and the data in which the Item_ID is 2 and the Quantity is 21 is stored in the page number 1. At a process 1103, the checksum of each page is calculated based on it. When the data as illustrated in FIG. 12 is notified from the data area extraction means 208, the data of each page are summed up at the process 1103. Then, as shown in FIG. 13 (checksum calculation example of the checksum calculation means), 202 is calculated as the checksum of the page number 0, and 23 is calculated as the checksum of the page number 1. At a process 1104, the calculated checksums are notified to the data check log generation means 210. In the foregoing, though a description has been made based on an example in which the table name of the check target is written in the check command designating the data area, an embodiment in which a command of checking all the tables is received can also be considered. In this case, the calculation of the checksum is performed for all the tables registered in the data area management table illustrated in FIG. 4.

Note that, in the above, a description has been made based on the example in which the data is a numerical value. However, the calculation of the checksum is possible even if the data other than the numerical value is used. For example, a data "A" is managed as 41 of the hexadecimal number in the calculating system, and it is converted into "A" by an ASCII code. In this manner, the data is managed as a numerical value in the calculating system, and even if it is the data other than the numerical value, the checksum thereof can be calculated.

Figure 14:
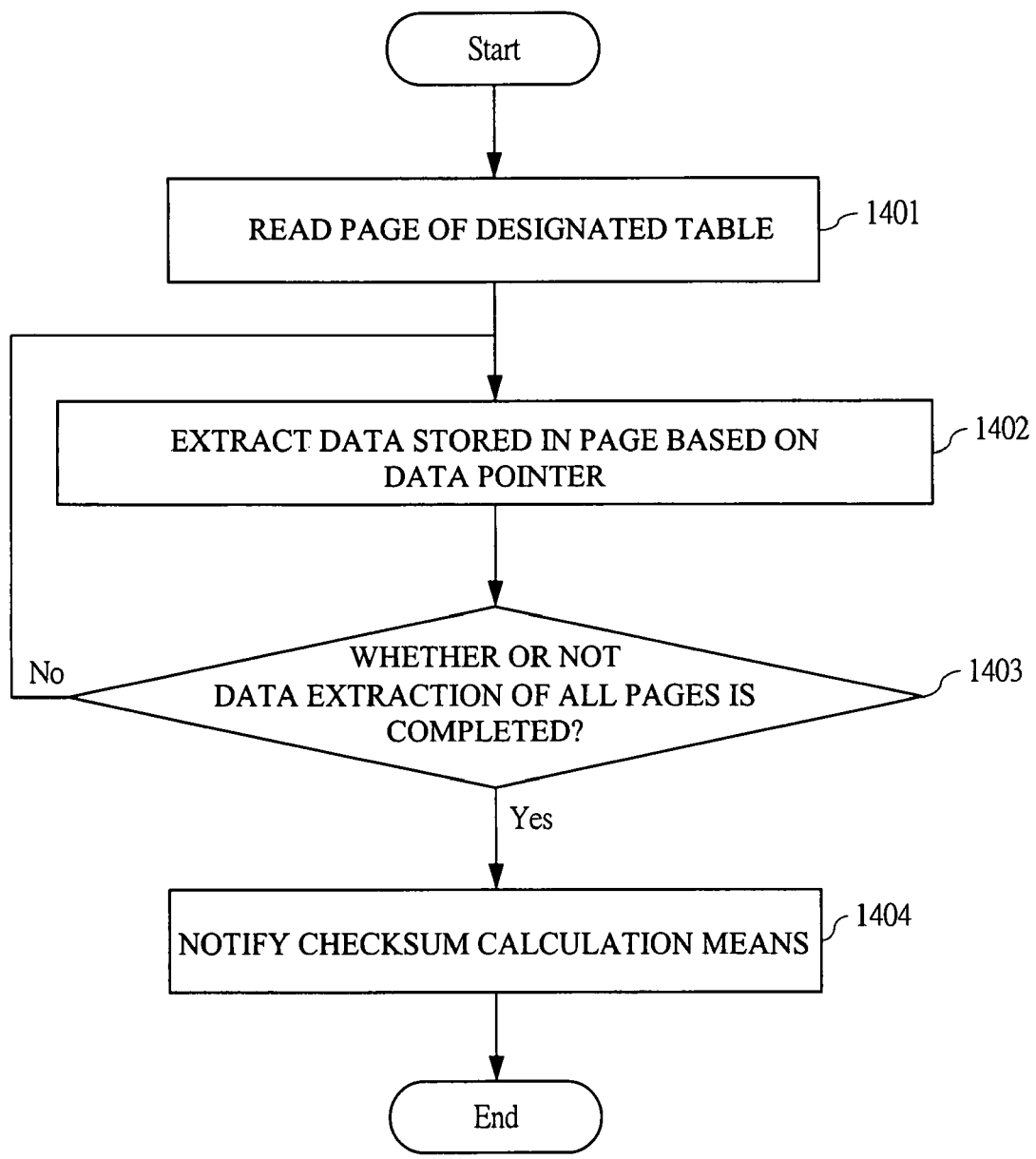
FIG. 14 is a flowchart showing the operations of data area extraction means in the backup system in an embodiment of the present invention.

FIG. 14 is a flowchart showing the operations of the data area extraction means 208. The data area extraction means 208 starts operating when it receives a notification from the checksum calculation means 209. At a process 1401, the pages of the table notified from the checksum calculation means 209 are read by using the data input and output means 207. At a process 1402, based on the data pointer illustrated in FIG. 5, the area in which the data is actually stored is extracted from the read page. At a determination 1403, it is determined whether or not the extraction of the data for all the pages of the designated area has been completed. This can be determined by referring to the end LBA 403 of the data area management table illustrated in FIG. 4. When the extraction of the data for all the pages has been completed, at a process 1404, the extraction result is notified to the checksum calculation means 209. This extraction result is the set of the page number and the data as illustrated in FIG. 12.

Figure 15:
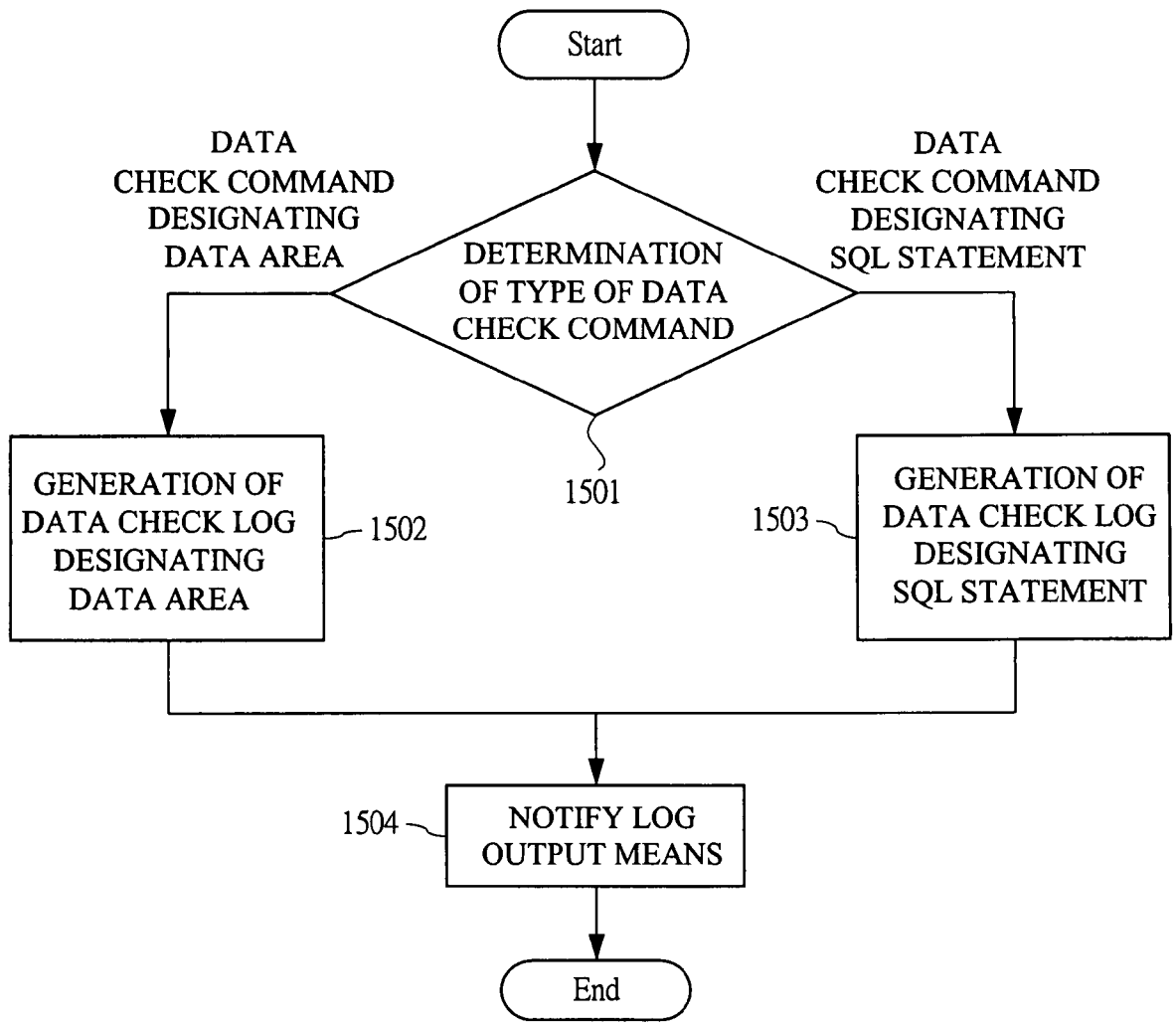
FIG. 15 is a flowchart showing the operations of data check log generation means in the backup system in an embodiment of the present invention.

FIG. 15 is a flowchart showing the operations of the data check log generation means 210. The data check log generation means 210 starts operating when it receives a notification from the checksum calculation means 209. At a determination 1501, a type of the data check command is determined. This determination is performed depending on whether a set of the SQL statement and the checksum is notified or a set of the page number and the checksum is notified from the checksum calculation means 209.

In the case of the data check command designating the SQL statement, a data check log is generated at a process 1503. In this case, the data check log includes the SQL statement for data check and the checksum of the execution result of the SQL statement. For example, as illustrated in FIG. 16 (an example of the written content of the data check log), "SELECT Quantity from Stock where 10<=Item_ID and Item_ID<=19" is written as the SQL statement for data check, and 55 is written as the checksum.

In the case of the data check command designating the data area, a data check log is generated at a process 1502. In this case, the data check log includes a data area name, a page number, and the checksum of each page. For example, as illustrated in FIG. 17 (another example of the written content of the data check log), a content that the checksum of the page number 1 of the Stock table is 202 and the checksum of the page number 2 thereof is 23 is written in the data check log.

The data check log generated at the process 1502 or at a process 1503 is notified to the log output means 206 at a process 1504. As described with reference to FIG. 10, the log output means 206 stores the log in the log storage area 213 by providing a serial number to it, and at the same time, it notifies it to the log transmission means 211.

As described above, the log serial number is provided according to an order in which the corresponding data of the data update log is updated and an order in which the corresponding checksum of the data check log is calculated. Consequently, by this serial number, it is possible to determine up to which data update has been completed at the time when the checksum is calculated. More specifically, in the secondary site, by calculating the checksum at the time when the data update log up to the serial number provided to the data check log is applied, the checksum can be calculated in synchronization with the primary site.

Figure 18:
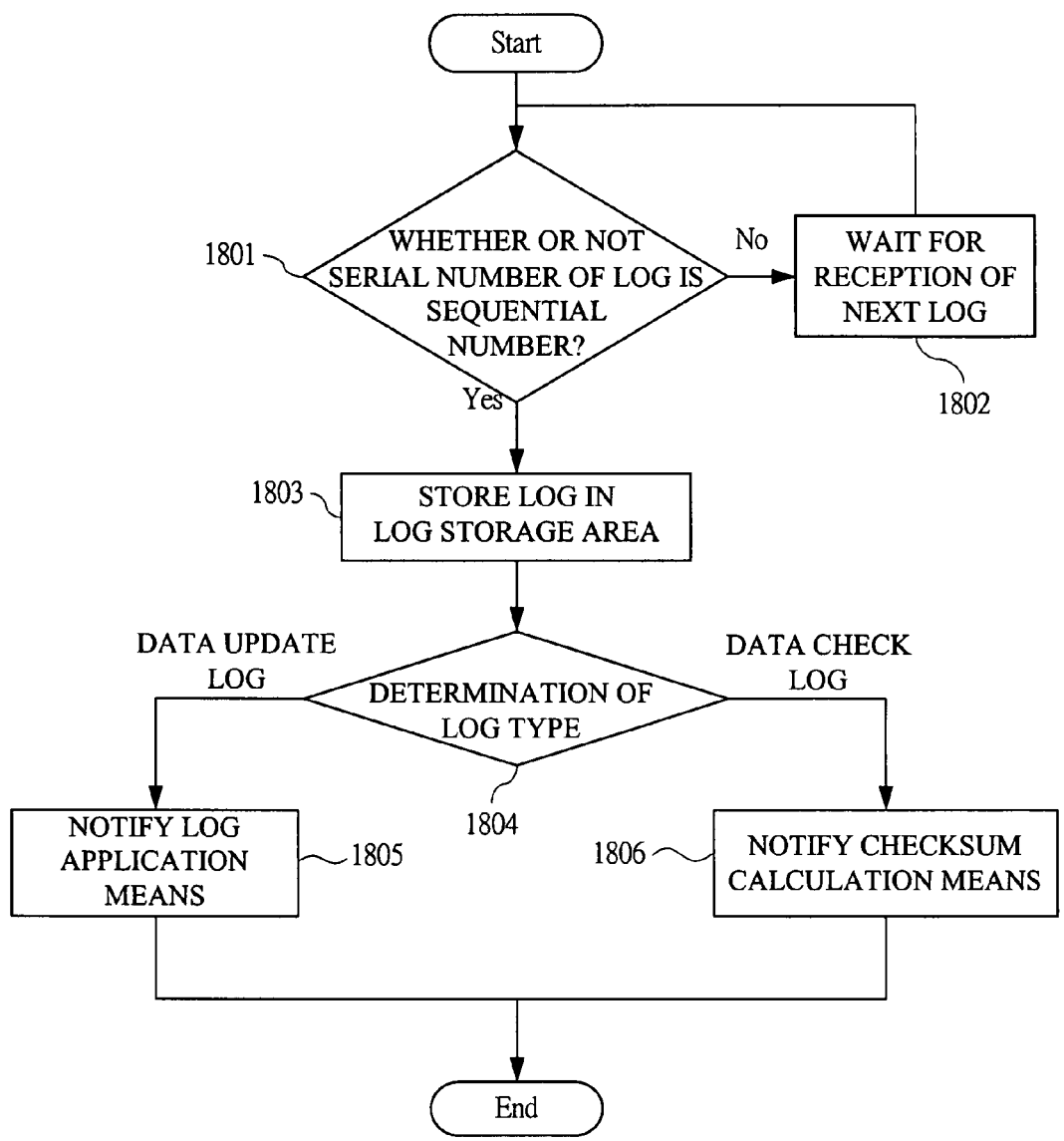
FIG. 18 is a flowchart showing the operations of log receiving means in the backup system in an embodiment of the present invention.

FIG. 18 is a flowchart showing the operations of the log receiving means 224. At a determination 1801, it is checked whether or not the serial number of the log is a sequential number. More specifically, it is checked whether the number of the log received this time is the next number of the log received last time. When the number is not an sequential number, at a process 1802, the log receiving means 224 is in a state of waiting for the next log. Through such a control, the log application and the calculation of the checksum are performed in an order of the serial number of the log.

At a process 1803, the received log is stored in the log storage area 234 by using the log input and output means 226. At a determination 1804, it is determined whether the received log is a data update log or a data check log. When the received log is a data update log, the operation proceeds to a process 1805 and the data update log is notified to the log application means 225. When the received log is a data check log, the operation proceeds to a process 1806, and the data check log is notified to the checksum calculation means 229.

Figure 19:
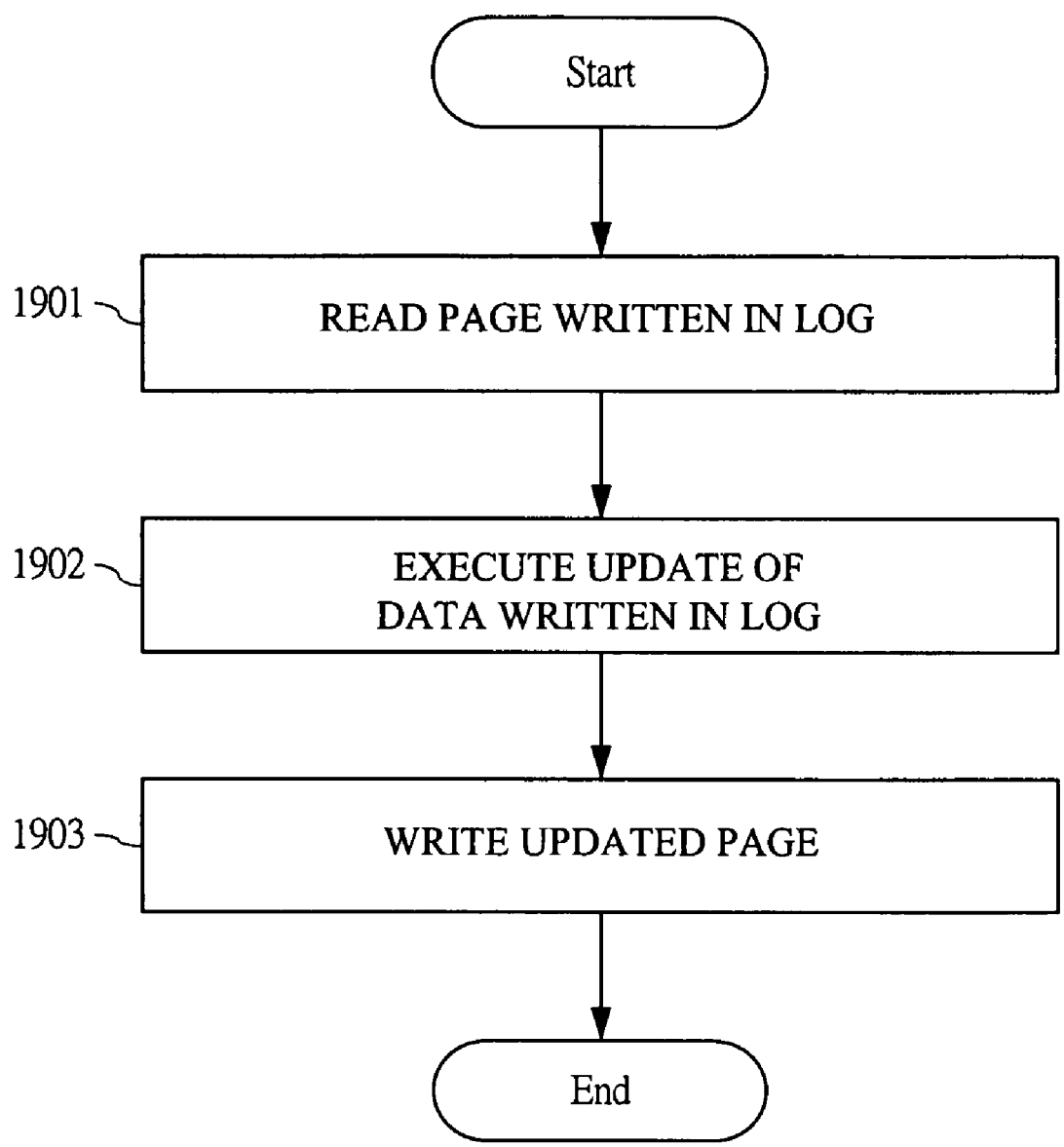
FIG. 19 is a flowchart showing the operations of log application means in the backup system in an embodiment of the present invention.

FIG. 19 is a flowchart showing the operations of the log application means 225. As described previously, page numbers and a method of changing the pages are written in the data update log. For example, the content of, for example, [Add a data having the Item_ID of 100 and the Quantity of 50 to the long number 1 and the page number 500] is written in the data update log. When such a data update log is received, at a process 1901, the page number 500 is read from the data storage area 235 to the memory area 222 by using the data input and output means 227. At a process 1902, the data update is performed for the page read in the memory area 222. In the case of the above-described data update log, a data having the Item_ID of 100 and the Quantity of 50 is added. At this time, as illustrated in FIG. 5, the data is added to the page, and at the same time, the data pointer is added. At a process 1903, the updated page is written in the data storage area 235 by using the data input and output means 227.

Figure 20:
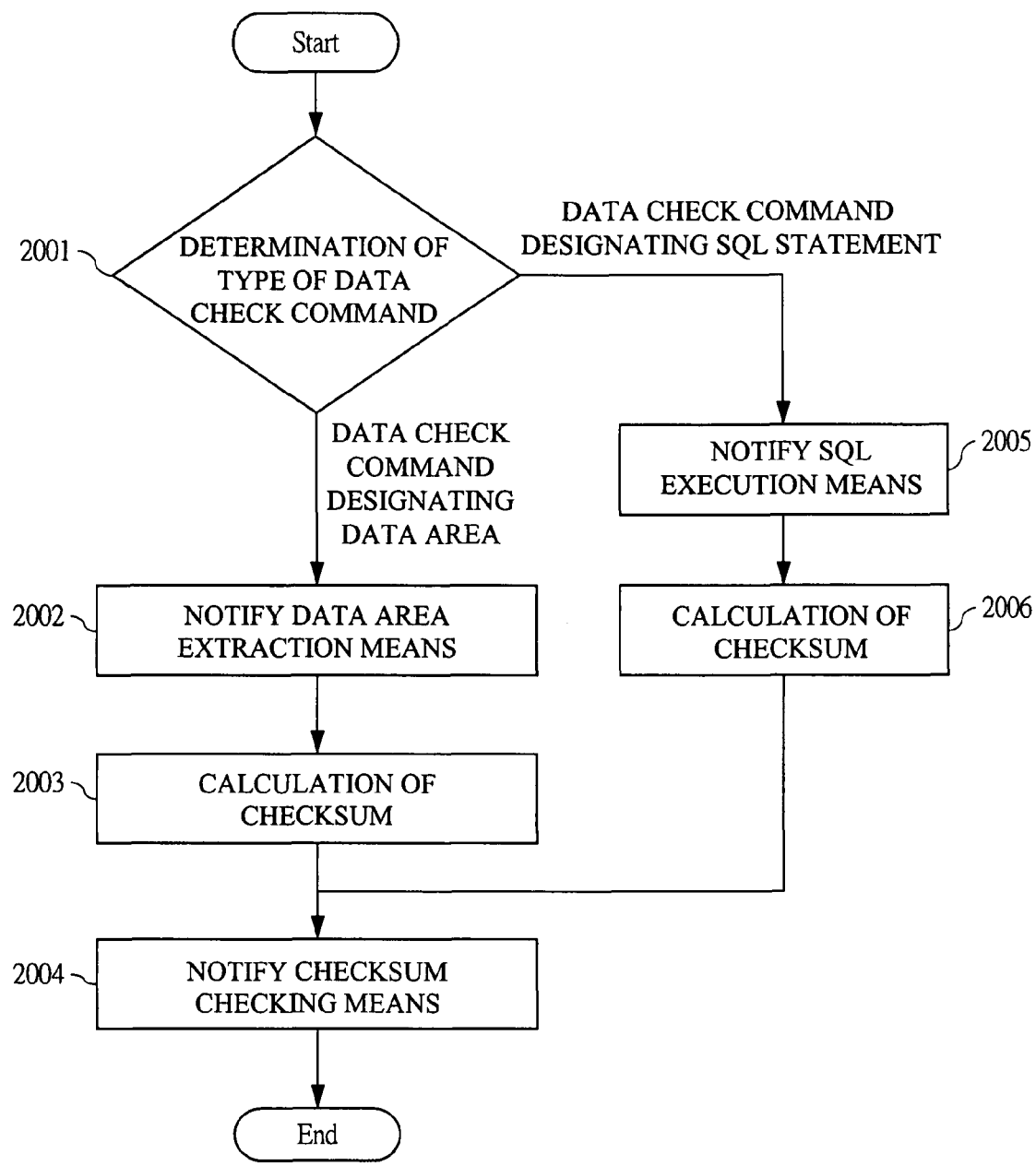
FIG. 20 is a flowchart showing the operations of checksum calculation means in the backup system in an embodiment of the present invention.

FIG. 20 is a flowchart showing the operations of the checksum calculation means 229. The checksum calculation means 229 starts operating when it receives a notification from the log receiving means 224. At a determination 2001, a type of the data check command notified from the log receiving means 224 is determined. In the case of the data check command designating the data area, it is notified to the data area extraction means 228 at a process 2002, and the data of the designated table is extracted by using the data area extraction means 228. At a process 2003, the checksum of the extracted data is calculated. In the case of the data check command designating the SQL statement, it is notified to the SQL execution means 232 at a process 2005. The SQL execution means 232 which has received the notification executes the SQL statement, and the execution result is notified to the checksum calculation means 229. At a process 2006, a checksum of the execution result of the SQL statement is calculated.

A calculating method of the checksum of the checksum calculation means 229 is the same as the method of the checksum calculation means 209 of the primary site. Further, the operations of the SQL execution means 232 are the same as those of the SQL execution means 205 of the primary site, and the operations of the data area extraction means 228 are the same as those of the data area extraction means 208 of the primary site.

When the calculation of the checksum is completed, the checksum calculation means 229 notifies the received data check log and the calculated checksum to the checksum checking means 230 at a process 2004.

Figure 21:
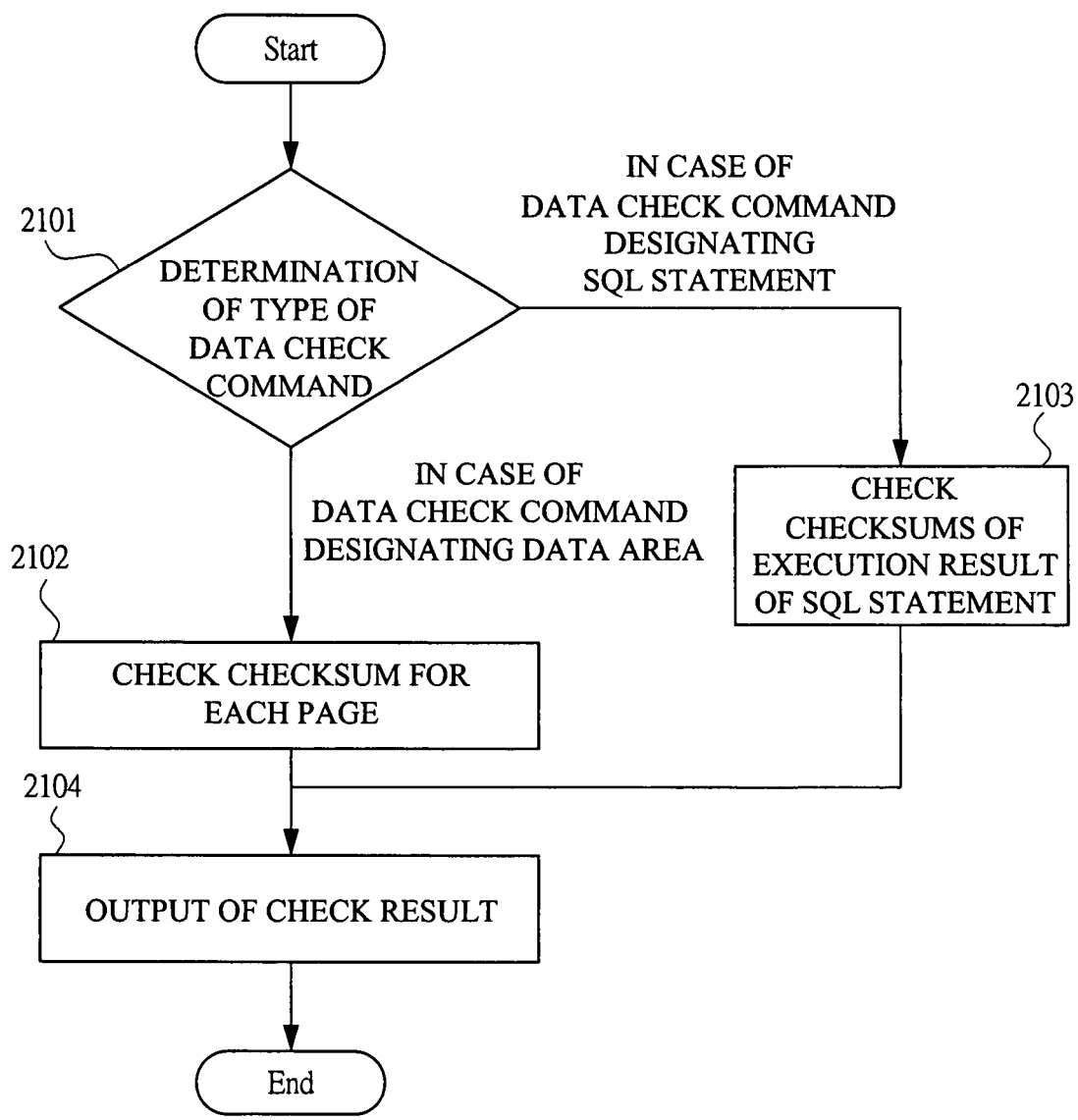
FIG. 21 is a flowchart showing the operations of checksum checking means in the backup system in an embodiment of the present invention.

FIG. 21 is a flowchart showing the operations of the checksum checking means 230. At a determination 2101, a type of the data check command is determined. In the case of the data check command designating the data area, the operation proceeds to a process 2102, and the checksums are checked. As shown in FIG. 17, in the case of the data check command designating the data area, page numbers and the checksum of each page are written in the received log. Further, as shown in FIG. 13, the checksum calculation means 229 calculates the checksum of each page. At a process 2102, the checksum written in the received log and the checksum calculated by the checksum calculation means 229 are checked for each page, and if all the checksums are of the same value, they are determined to be consistent, and if any one of them are different, they are determined to be inconsistent.

In the case of the data check command designating the SQL statement, the operation proceeds to a process 2103, and the checksums are checked. As shown in FIG. 16, in the case of the data check command designating the SQL statement, the SQL statement and a checksum of the execution result thereof are written in the received log. The checksum calculation means 229 executes the SQL statement in the secondary site and calculates the checksum of the execution result thereof. At a process 2103, the checksum written in the data check log and the checksum calculated by the checksum calculation means 229 are checked, and if the values are the same, they are determined to be consistent, and if different, they are determined to be inconsistent. At a process 2104, the check result is notified to the operation terminal 108.

As described above, according to the present embodiment, by providing the data check log generation means 210 and the like so that the data update log and the data check log are transmitted in order to the secondary site, the timings of the checksum calculation can be synchronized. Also, by providing the data area extraction means 208 and 228 and the like, the verification of data consistency can be performed regardless of the storage position of the data. As a result, the check operation of the backup data can be facilitated.

In the foregoing, the invention made by the inventors of the present invention has been concretely described based on the embodiments. However, it is needless to say that the present invention is not limited to the foregoing embodiments and various modifications and alterations can be made within the scope of the present invention.

Figure 22:
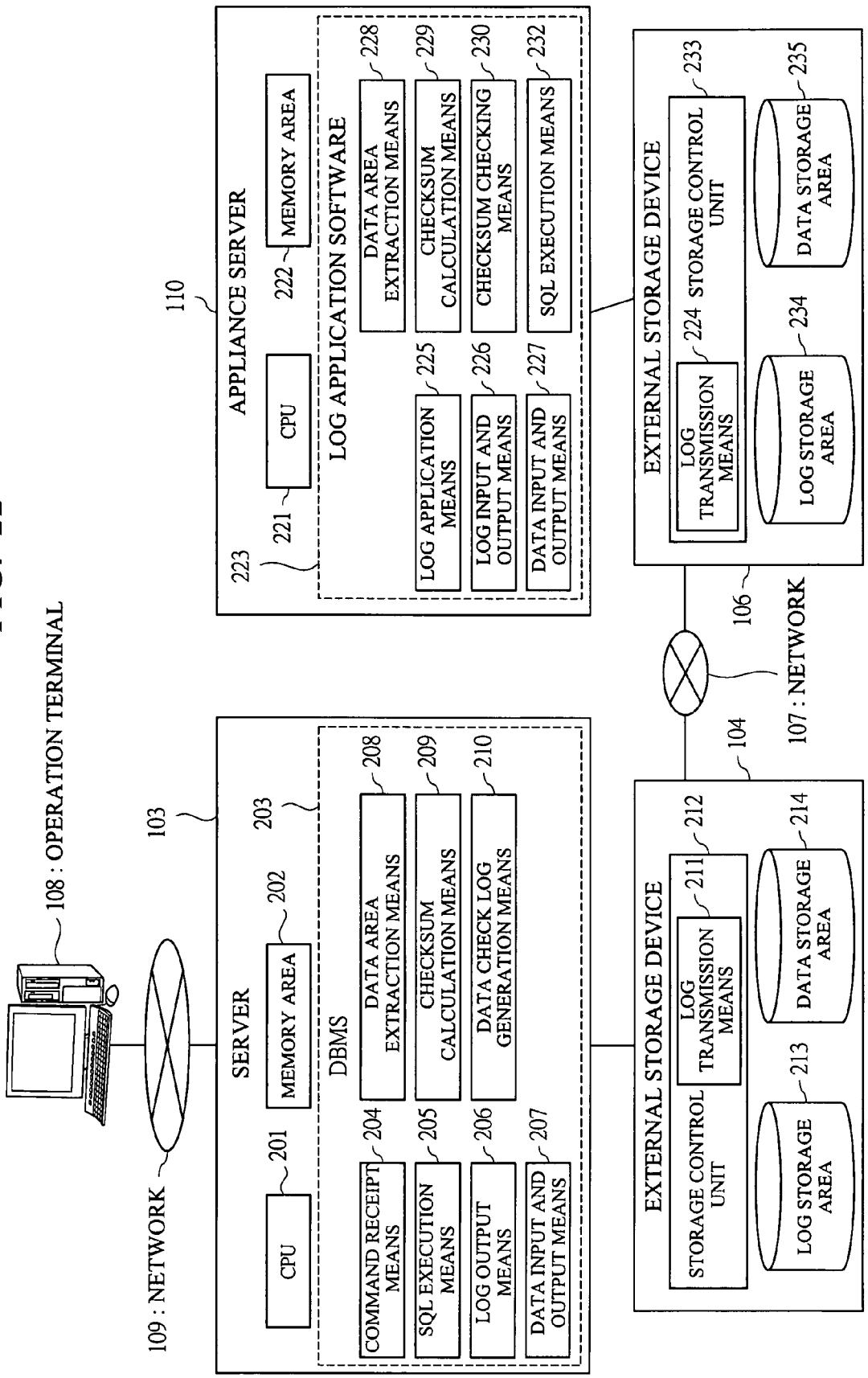
FIG. 22 is a diagram showing another system configuration example of the backup system in an embodiment of the present invention in detail.

For example, in the above-described embodiment, a description has been made based on the example in which the log transmission means 211 is operated by the server 103 and the log receiving means 224 is operated by the server 105. As shown in FIG. 22, however, an embodiment in which the log transmission means 211 is operated by the external storage device 104 and the log receiving means 224 is operated by the external storage device 106 is also preferable. Further, an embodiment in which the log application software 223 is not operated by the server 105 of the secondary site, but the log application software 223 is operated by an appliance server 110 attached to the external storage device 106 is also preferable. In this case, the network 107 connects the external storage device 104 and the external storage device 106. When the log output means 206 issues a request for outputting a log to the storage control unit 212, the log transmission means 211 transmits the log to the log receiving means 224. Further, in this configuration, the operation terminal 108 is connected to the server 103 through the network 109.

Further, the above-described embodiments are the best modes of carrying out the present invention, and the present invention is not limited to these embodiments. For example, though a description has been made by using the pages of the DBMS in the above-described embodiments, the data storage area described in the appended claims does not designate only the pages of the DBMS.

Further, the present invention can be applied also to a program functioning as various means of the DBMS and various means of the log application software and to a storage medium which stores a program for executing the various processes in the flowcharts described in the embodiments above.

The verifying technology of the backup data of the present invention can be applied to the method for verifying data consistency of the backup system, program and storage medium and others.

What is claimed is:

1. A calculating system, comprising:
a first server;
a first storage device connected to the first server and including:
a first data storage area, and
a first log storage area used by the first server;
a second server; and
a second storage device connected to the second server,
wherein the first server includes:
a data output unit that transmits an update request to the first data storage area from outside to the first storage device,
a first check process execution unit that, upon receiving a data check command to check data included in the first data storage area, executes a first check process of data corresponding to the check command,
a first log output unit that provides other log information and order information for specifying an order relation to an update log corresponding to the update request to transmit the update log to the first storage device so as to be stored in the first log storage area, and that further provides other log information including the update log and order information for specifying an order relation to a check log showing a processing history of the check command including a first execution result of the check process by the first check process execution unit to transmit the check log to the first storage device so as to be stored in the first log storage area, and
a log transmission unit that transmits one or more log information stored in the first log storage area to the second server;
wherein the second storage device includes:
a second log storage area, and
a second data storage area;
wherein the second server includes:
a second log output unit that stores the log information received from the first server in the second log storage area of the second storage device,
a log type determination unit that determines whether the log information read in accordance with the order information provided to the log information is an update log or a check log,
a log application unit that applies the update log to the second data storage area when the read log information is an update log as a result of the determination by the log type determination unit,
a second check process execution unit that executes check process for calculating checksum of data included in the second data storage area when the read log information is a check log as a result of the determination by the log type determination unit, and an execution result comparison unit that compares a second execution result by the second check process execution unit and a first execution result included in the log information.

2. The calculating system according to claim 1, wherein the second data storage area stores data equal to the data stored in the first data storage area or data equal to data at a point older than at present in the first data storage area.

3. The calculating system according to claim 1, wherein the first server includes a command reception unit that determines whether the received command from outside is a check command or an update request.

4. The calculating system according to claim 3, wherein:
when the command received from outside is determined to be the check command by the command reception unit, the first check process execution unit determines a data area specified by the check command from the first data storage area, reads the specified data area, and calculates a first data checksum in the specified data area as the first execution result, the second check process execution unit calculates a second data checksum of a data area in the second data storage area corresponding to the specified data area as the second execution result, and the execution result comparison unit compares the first data checksum and the second data checksum.

5. The calculating system according to claim 4, wherein:
the data area is specified in units of pages, and
the first data checksum and the second data checksum are respectively calculated in units of pages.

6. The calculating system according to claim 1, wherein the check log includes a data check command described by SQL statement and directed to the data included in the first data storage area and the first execution result.

7. A calculating system, comprising:
a first server;
a first storage device connected to the first server through a first communication line and including a first data storage area and a first log storage area used by the first server;
a second server; and
a second storage device connected to the second server through a second communication line,
wherein the first server includes:
a first data output unit that transmits an update request to the first data storage area from outside to the first storage device through the first communication line,
a first check process execution unit that, upon receiving a data check command to data included in the first data storage area from outside, executes a first check process of data corresponding to the check command, and a log output unit that provides other log information and order information for specifying an order relation to an update log corresponding to the update request to output the update log to the first storage device through the first communication line and that provides other log information including the update log and order information for specifying an order relation to a check log showing processing history of the check command including a first execution result of the check process by the first check process execution unit to output the check log to the first storage device through the first communication line;

wherein the first storage device includes:
a first log storage unit that stores the update log provided with the order information in the first log storage area and stores the check log provided with the order information in the first log storage area, and a log transmission unit that transmits one or more log information stored in the first log storage area to the second storage device through a third communication line;

wherein the second storage device includes:
a second log storage area,
a second data storage area, and
second log storage unit that stores log information received through the third communication line from the first storage device in the second log storage area; and the second server includes:
a log reading unit that reads the log information stored in the second log storage area of the second storage device together with the order information through the second communication line, a log type determination unit that determines whether log information read in accordance with the order information provided to the log information is an update log or a check log, a log application unit that applies the update log to the second data storage area of the second storage device through the second communication line when the read log information is an update log as a result of the determination by the log type determination unit, a second check process execution unit that executes check process for calculating checksum of data included in the second data storage area when the read log information is a check log as a result of the determination by the log type determination unit, and an execution result comparison unit that compares a second execution result by the second check process execution unit and a first execution result included in the log information.

* * * * *